(12) United States Patent
Tadokoro et al.

(10) Patent No.: US 9,733,830 B2
(45) Date of Patent: Aug. 15, 2017

(54) ELECTRONIC DEVICE, CONTROL METHOD OF ELECTRONIC DEVICE AND CONTROL PROGRAM OF ELECTRONIC DEVICE

(75) Inventors: Hitomi Tadokoro, Tokyo (JP); Hideyoshi Nagado, Sagamihara (JP)

(73) Assignee: JVC KENWOOD CORPORATION, Yokohama-Shi, Kanagawa (JP)

(*) Notice: Subject to any disclaimer, the term of this patent is extended or adjusted under 35 U.S.C. 154(b) by 856 days.

(21) Appl. No.: 13/518,655

(22) PCT Filed: Dec. 22, 2010

(86) PCT No.: PCT/JP2010/073190
§ 371 (c)(1),
(2), (4) Date: Jun. 22, 2012

(87) PCT Pub. No.: WO2011/078251
PCT Pub. Date: Jun. 30, 2011

(65) Prior Publication Data
US 2012/0262377 A1 Oct. 18, 2012

(30) Foreign Application Priority Data

Dec. 25, 2009 (JP) ................................. P2009-294215
Dec. 17, 2010 (JP) ................................. P2010-281115

(51) Int. Cl.
*G06F 3/02* (2006.01)
*G06F 3/0489* (2013.01)
(52) U.S. Cl.
CPC ........ *G06F 3/04895* (2013.01); *G06F 3/0489* (2013.01)

(58) Field of Classification Search
CPC ..... G06F 3/0202; G06F 3/0219; G06F 3/0213
USPC ...................................................... 345/16–169
See application file for complete search history.

(56) References Cited

U.S. PATENT DOCUMENTS

| | | | | |
|---|---|---|---|---|
| 4,609,919 A | * | 9/1986 | Miyazaki et al. | 345/56 |
| 4,970,680 A | * | 11/1990 | Walters | 345/55 |
| 5,530,900 A | * | 6/1996 | Sterling | 710/18 |
| 5,539,499 A | * | 7/1996 | Fujisawa | 399/9 |
| 6,154,201 A | * | 11/2000 | Levin et al. | 345/184 |
| 6,292,176 B1 | * | 9/2001 | Reber et al. | 345/169 |
| 6,633,930 B2 | * | 10/2003 | Sonehara et al. | 710/62 |
| 6,704,453 B2 | * | 3/2004 | Tsuchida | H04N 1/2112 358/1.15 |
| 6,993,615 B2 | * | 1/2006 | Falcon | 710/303 |
| 8,103,970 B1 | * | 1/2012 | Allen et al. | 715/841 |

(Continued)

FOREIGN PATENT DOCUMENTS

JP 3052545 U 7/1998
JP 2004-210216 A 7/2004

(Continued)

*Primary Examiner* — Carolyn R Edwards
*Assistant Examiner* — Mansour M Said
(74) *Attorney, Agent, or Firm* — Nath, Goldberg & Meyer; Jerald L. Meyer; Stanley N. Protigal (57) ABSTRACT

Operation keys are arranged on a front panel along with a display screen. When an electronic device has a certain state, information indicating the certain state is displayed on the display screen. A dynamic figure is displayed on a region on the display screen corresponding to a position of a specific operation key to be operated at the time of the certain state, among the operation keys.

18 Claims, 9 Drawing Sheets

(56) References Cited

U.S. PATENT DOCUMENTS

| | | | |
|---|---|---|---|
| 8,739,036 B2* | 5/2014 | Morimoto | G06F 3/04842 715/705 |
| 2008/0088591 A1* | 4/2008 | Joo et al. | 345/170 |
| 2009/0164062 A1* | 6/2009 | Aoki et al. | 701/36 |
| 2010/0118160 A1* | 5/2010 | Tsurumi | 348/231.2 |
| 2010/0175091 A1* | 7/2010 | Revell | G06Q 30/0601 725/60 |
| 2012/0319984 A1* | 12/2012 | Borovsky | G06F 3/04883 345/173 |
| 2013/0245835 A1* | 9/2013 | Watanabe | 700/275 |

FOREIGN PATENT DOCUMENTS

| | | | |
|---|---|---|---|
| JP | 2006-60399 A | 3/2006 | |
| JP | 2006-174113 A | 6/2006 | |

\* cited by examiner

(a) T-TITLE ▸ metown Glory | FAV
    P-TIME ▸ F02 T-02  1:17 | TAG — 71

(b) CALLING (c) CALLING Jo — Im2

(d) CAL   Jo — Im2

(e) CA   Jo — Im2

(f)  LLING J — Im2

(g) CALLING Jo — Im2

(h) CALLING Joh — Im2

(i) CALLING John (j) CALLIN   S — Im2

⋮

Im4

(k) Talking  0:00

ELECTRONIC DEVICE, CONTROL METHOD OF ELECTRONIC DEVICE AND CONTROL PROGRAM OF ELECTRONIC DEVICE

This is a National Phase Application filed under 35 U.S.C. 371 as a national stage of PCT/JP2010/073190 filed Dec. 22, 2010, and claims priority from Japanese Application No. 2009-294215, filed Dec. 25, 2009 and from Japanese Application No. 2010-281115, filed Dec. 17, 2010, the content of each of which is hereby incorporated by reference in its entirety.

TECHNICAL FIELD

The present invention relates to an electronic device that includes operation keys and a display portion having a display screen on which various pieces of information are displayed, a control method for controlling the electronic device, and a control program.

BACKGROUND ART

As one example of electronic device, there has been an in-vehicle device such as a car navigation device or a car audio device. The in-vehicle device usually includes a display portion having a display screen on which various pieces of information are displayed, and operation keys to be used to operate the in-vehicle device. There has been also an in-vehicle device that has a function for allowing a hands-free talking on a mobile using the in-vehicle device.

Patent Literature 1 describes that a dynamic image is displayed on a display portion according to a type or push time of an operation key (operation button) pushed, or a dynamic image is displayed on the display portion when the operation key is not being pushed more than a predetermined time.

CITATION LIST

Patent Literature

Patent Literature 1: Japanese Patent Application Laid-open Publication No. 2004-210216

SUMMARY OF INVENTION

Technical Problem

As described above, an electronic device usually includes operation keys. If it is difficult to recognize which key of operation keys is to be operated when a user operates the electronic device, operability of the electronic device is reduced. Especially, since there are many cases in an in-vehicle device where a driver operates the in-vehicle device, it is desired that a key to be operated is easily recognized. The invention described in Patent Literature 1 does not notify a user of information as to which key of operation keys is to be operated. It is desired that a technology that allows a user to easily recognize which key of operation keys is to be operated, comes out.

The present invention is made in order to address such requirements, and has an object to provide an electronic device that allows a user to easily recognize which key of operation keys is to be operated, a control method of the electronic device and a control program of the electronic device.

Solution to Problem

In order to resolve the above-described conventional technical problem, the present invention provides an electronic device including: a display portion (7) that has a display screen (71); a plurality of operation keys (52 to 55) that is arranged along with the display screen; and a display control portion (1) that displays, when the electronic device has a certain state, on the display screen information indicating the certain state, wherein the display control portion displays a dynamic figure (Im1, Im2) on a region on the display screen corresponding to a position of a specific operation key to be operated at the time of the certain state, among the plurality of operation keys.

It is preferable that the dynamic figure is a figure traveling away from the specific operation key or a figure approaching the specific operation key.

It is preferable that the dynamic figure is a figure spreading around the specific operation key or a figure narrowing around the specific operation.

It is preferable to further include: an illuminating portion (6) that is mounted with respect to the specific operation key; and a luminance control portion (1) that changes luminance of the illuminating portion in response to display of the dynamic figure on the display screen.

It is preferable that the certain state is a state where one selection item is displayed on the display screen among a plurality of selection items, and the specific operation key is an operation key (52) to be used to establish the one selection item.

It is preferable that the display control portion starts display of the dynamic figure when a predetermined time elapses from the time of displaying the one selection item on the display screen.

It is preferable that the certain state is a state where a call is received on a portable terminal (20) connected to the electronic device and information indicating that the call is received is displayed on the display screen, and the specific operation key is an operation key (54) to be used to start communication by the portable terminal.

It is preferable that the display control portion starts display of the dynamic figure when a predetermined time elapses from the time of displaying the information indicating that the call is received on the display screen.

In order to resolve the above-described conventional technical problem, the present invention provides a control method of an electronic device including: displaying, when the electronic device has a certain state, on a display screen (71) information indicating the certain state; and displaying a dynamic figure (Im1, Im2) on a region on the display screen corresponding to a position of a specific operation key to be operated at the time of the certain state, among a plurality of operation keys arranged along with the display screen.

It is preferable that the dynamic figure is a figure traveling away from the specific operation key or a figure approaching the specific operation key.

It is preferable that the dynamic figure is a figure spreading around the specific operation key or a figure narrowing around the specific operation.

It is preferable to further include: changing luminance of an illuminating portion (6) mounted with respect to the specific operation key, in response to display of the dynamic figure on the display screen.

It is preferable that the certain state is a state where one selection item is displayed on the display screen among a plurality of selection items, and the specific operation key is an operation key (52) to be used to establish the one selection item.

It is preferable to further include: starting display of the dynamic figure when a predetermined time elapses from the time of displaying the one selection item on the display screen.

It is preferable that the certain state is a state where a call is received on a portable terminal (20) connected to the electronic device and information indicating that the call is received is displayed on the display screen, and the specific operation key is an operation key (54) to be used to start communication by the portable terminal.

It is preferable to further include: starting display of the dynamic figure when a predetermined time elapses from the time of displaying the information indicating that the call is received on the display screen.

In order to resolve the above-described conventional technical problem, the present invention provides a control program of an electronic device causing a computer mounted in the electronic device to execute steps including: a first display step for displaying, when the electronic device has a certain state, on a display screen (71) information indicating the certain state; and a second display step for displaying a dynamic figure (Im1, Im2) on a region on the display screen corresponding to a position of a specific operation key to be operated at the time of the certain state, among a plurality of operation keys arranged along with the display screen.

It is preferable that the dynamic figure is a figure traveling away from the specific operation key or a figure approaching the specific operation key.

It is preferable that the dynamic figure is a figure spreading around the specific operation key or a figure narrowing around the specific operation.

It is preferable to cause the computer to further execute: a step for changing luminance of an illuminating portion mounted with respect to the specific operation key, in response to display of the dynamic figure on the display screen.

It is preferable that the certain state is a state where one selection item is displayed on the display screen among a plurality of selection items, and the specific operation key is an operation key (52) to be used to establish the one selection item.

It is preferable that the second display step starts display of the dynamic figure when a predetermined time elapses from the time of displaying the one selection item on the display screen.

It is preferable that the certain state is a state where a call is received on a portable terminal connected to the electronic device and information indicating that the call is received is displayed on the display screen, and the specific operation key is an operation key (54) to be used to start communication by the portable terminal.

It is preferable that the second display step starts display of the dynamic figure when a predetermined time elapses from the time of displaying the information indicating that the call is received on the display screen.

Advantageous Effects of Invention

According to the electronic device, the control method of the electronic device and the control program of the electronic device of the present invention, it is possible to easily recognize which key of operation keys is to be operated. This increases operability of the electronic device.

DESCRIPTION OF EMBODIMENTS

Figure 1:
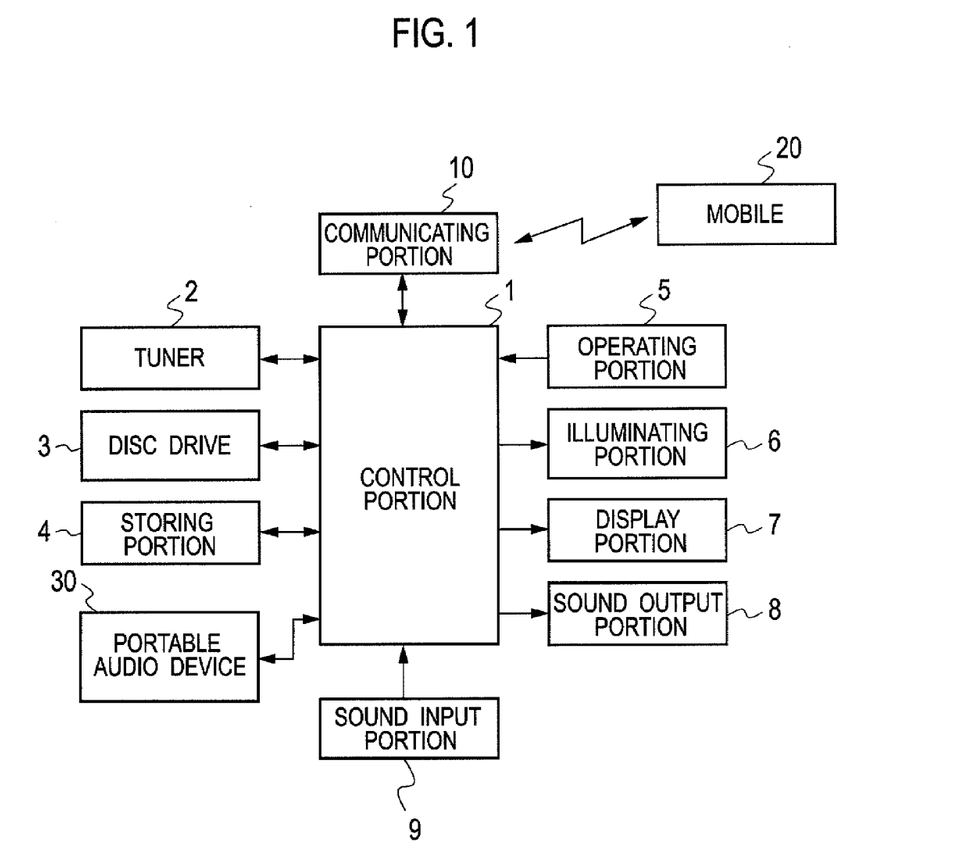
FIG. 1 It is a block diagram that shows an electronic device according to an exemplary embodiment of the present invention.

An exemplary embodiment of an electronic device, a control method of the electronic device and a control program of the electronic device of the present invention will be described below with reference to the drawings. In the present embodiment shown in FIG. 1, an in-vehicle audio device is cited as one example of the electronic device. In FIG. 1, a control portion 1 controls respective portions as will be described later. A tuner 2 receives a radio broadcast wave, for example. The tuner 2 receives a broadcast wave signal with a frequency indicated by the control portion 1, and supplies a sound signal to the control portion 1. When a user operates an operating portion 5 to select a broadcast station, an operation signal from the operating portion 5 is input into the control portion 1 and the control portion 1 controls the tuner 2 such that it receives the broadcast wave signal with the frequency corresponding to the selected broadcast station. The sound signal from the tuner 2 is supplied to a sound output portion 8 and output as sound.

A disc drive 3 plays a disc such as a compact disc (CD) and supplies a reproduced sound signal to the control portion 1. The sound signal from the disc drive 3 is supplied to the sound output portion 8 and output as sound. A storing portion 4 stores therein various control programs to be executed by the control portion 1 and various pieces of information necessary for operating respective portions. The control portion 1 reads respective control programs from the storing portion 4, reads out respective pieces of information from the storing portion 4, and writes various pieces of information into the storing portion 4. The operating portion 5 includes a knob and operation keys to be used to operate the audio device. The illuminating portion 6 is provided to illuminate the operating portion 5 such that a user easily operates the operating portion 5. As one example, the illuminating portion 6 is composed of a light-emitting diode (LED). Details of the operating portion 5 and the illuminating portion 6 will be described later.

As one example, a display portion 7 is composed of a liquid crystal panel, and displays various pieces of information such as characters and figures according to an instruction from the control portion 1. The sound output portion 8 includes an amplifier for amplifying a sound signal and a speaker for electroacoustic-converting the sound signal from the amplifier. A volume of sound from the sound output portion 8 is adjusted by the control portion 1 according to operation by the operating portion 5. A sound input portion 9 converts a user utterance into a sound signal and supplies it to the control portion 1.

The audio device shown in FIG. 1 has a configuration with a function for allowing a hands-free talking on a mobile 20 as one example of mobile terminal. A communicating portion communicates with the mobile 20 according to a short-distance wireless communication protocol such as Bluetooth (registered mark). A sound signal from the mobile 20 is supplied to the sound output portion 8 via the communicating portion 10 and the control portion 1 and output as sound. A user utterance is converted into a sound signal by the sound input portion 9 and supplied to the mobile 20 via the control portion 1 and the communicating portion 10.

The audio device shown in FIG. 1 is also configured to be connected to a portable audio instrument 30 and allowed to reproduce a sound signal of music stored in the portable audio instrument 30. The sound signal reproduced by the portable audio instrument 30 is supplied to the sound output portion 8 via the control portion 1. By operation by the operating portion 5, any one of the tuner 2, the disc drive 3 and the portable audio instrument 30 is selected as a source of a sound signal at a time of outputting sound from the sound output portion 8.

Figure 2:
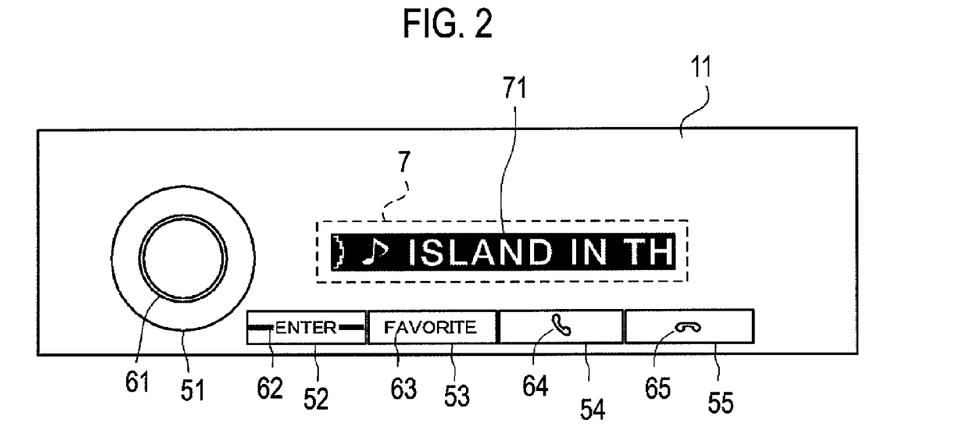
FIG. 2 It is a front view of the electronic device according to the exemplary embodiment.

The operating portion 5, the illuminating portion 6 and the display portion 7 will be described with reference to the front view of the audio device shown in FIG. 2. In FIG. 2, the display portion 7 has a display screen 71 mounted in a housing of the audio device to be visible from a side of a front panel 11 of the housing. In the example shown in FIG. 2, as the operating portion 5, the audio device includes the knob 51 to be rotationally-operated and four operation keys 52 to 55 which are operation buttons to be pushed. The operation keys 52 to 55 are arranged in parallel to sides in the longitudinal direction of the display screen 71. Characters "ISLAND IN TH" which is a part of the name "ISLAND IN TH . . ." of music which is a selection item are displayed on the display screen 71.

The knob 51 is used to change a selection item in series to display it on the display screen 71 according to the rotational operation, for example. The operation key 52 is an enter key to be used to establish the selection of selection item displayed on the display screen 71, hereinafter will be called an enter key 52. The operation key 53 is a favorite key to be used to preset a desired broadcast station or menu, select the preset broadcast station, or display the preset menu on the display screen 71, hereinafter will be called a favorite key 53.

The operation key 54 is a talking start key to be used to be pushed at the time of starting a hands-free talking in response to incoming call on the mobile 20, hereinafter will be called a talking start key 54. The operation key 55 is a talking finish key to be pushed at the time of finishing a hands-free talking to disconnect the mobile 20, hereinafter will be called a talking finish key 55. The knob 51, the enter key 52, the favorite key 53, the talking start key 54 and the talking finish key 55 are merely exemplary members in the operating portion 5. The types and number of members in the operating portion 5 are not limited to the present embodiment.

The knob 51 is provide with a ring-shaped illuminating portion 61 as the illuminating portion 6. The enter key 52 is provided with an illuminating portion 62 including characters "ENTER" between two horizontal lines and two horizontal lines. The favorite key 53 is provided with an illuminating portion 63 including characters "FAVORITE". The talking start key 54 is provided with an illuminating portion 64 including a figure of telephone receiver picked up. The talking finish key 55 is provided with a figure of telephone receiver put down. These illuminating portions 61 to 65 are illuminated by LEDs mounted at back sides of the knob 51, the enter key 52, the favorite key 53, the talking start key 54 and the talking finish key 55 to be bright.

In the state where the name of certain music is displayed as shown in FIG. 2, when the enter key 52 is pushed, the selection of music to be played is established. If the music "ISLAND IN TH . . . " is stored in the portable audio instrument 30, the control portion 1 instructs the portable audio instrument 30 to play the music "ISLAND IN TH . . . ", and an audio signal of the music being played is supplied to the sound output portion 8 and output as sound (music).

Figure 3:
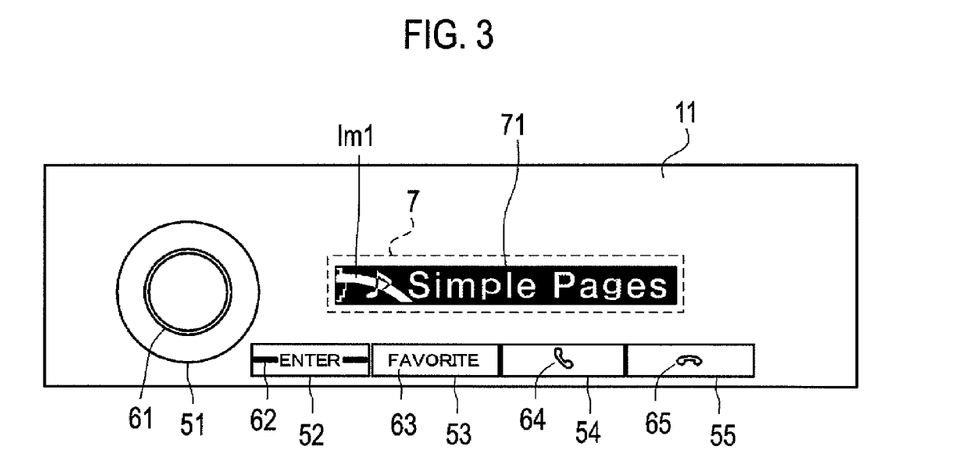
FIG. 3 It is a front view of the electronic device that illustrates a first example of dynamic figures.

FIG. 3 illustrates a state where another music "Simple Pages" is selected to be displayed on the display screen 71. In the present embodiment, in the situation where music is selected using the knob 51 and a name of the music is displayed on the display screen 71, when the enter key 52 is not being pushed even if a predetermined period elapsed from the display start, a dynamic figure for promoting push of the enter key 52 is displayed on the display screen 71. Here, although music is cited as an example of the selection item, a dynamic figure for promoting push of the enter key 52 may be displayed on the display screen 71 in the same manner for another selection item such as an album in which music is included, a folder in which music is stored, a category of music or an artiest.

In the situation where the name "Simple Pages" of music is displayed on the display screen 71, when the enter key 52 is not being pushed even if the predetermined period elapsed from the display start, the control portion 1 controls the display portion 7 to display a dynamic figure Im1 on a left end of the display screen 71 as shown in FIG. 3. FIG. 3 shows a momentary state of the dynamic figure Im1. When a name of music is displayed on the display screen 71, an operation key to be pushed is only the enter key 52 among the enter key 52, the favorite key 53, the talking start key 54 and the talking finish key 55. Thus, the control portion 1 displays the dynamic figure Im1 on a region corresponding to a position of the enter key 52 in the display screen 71.

Figure 4:
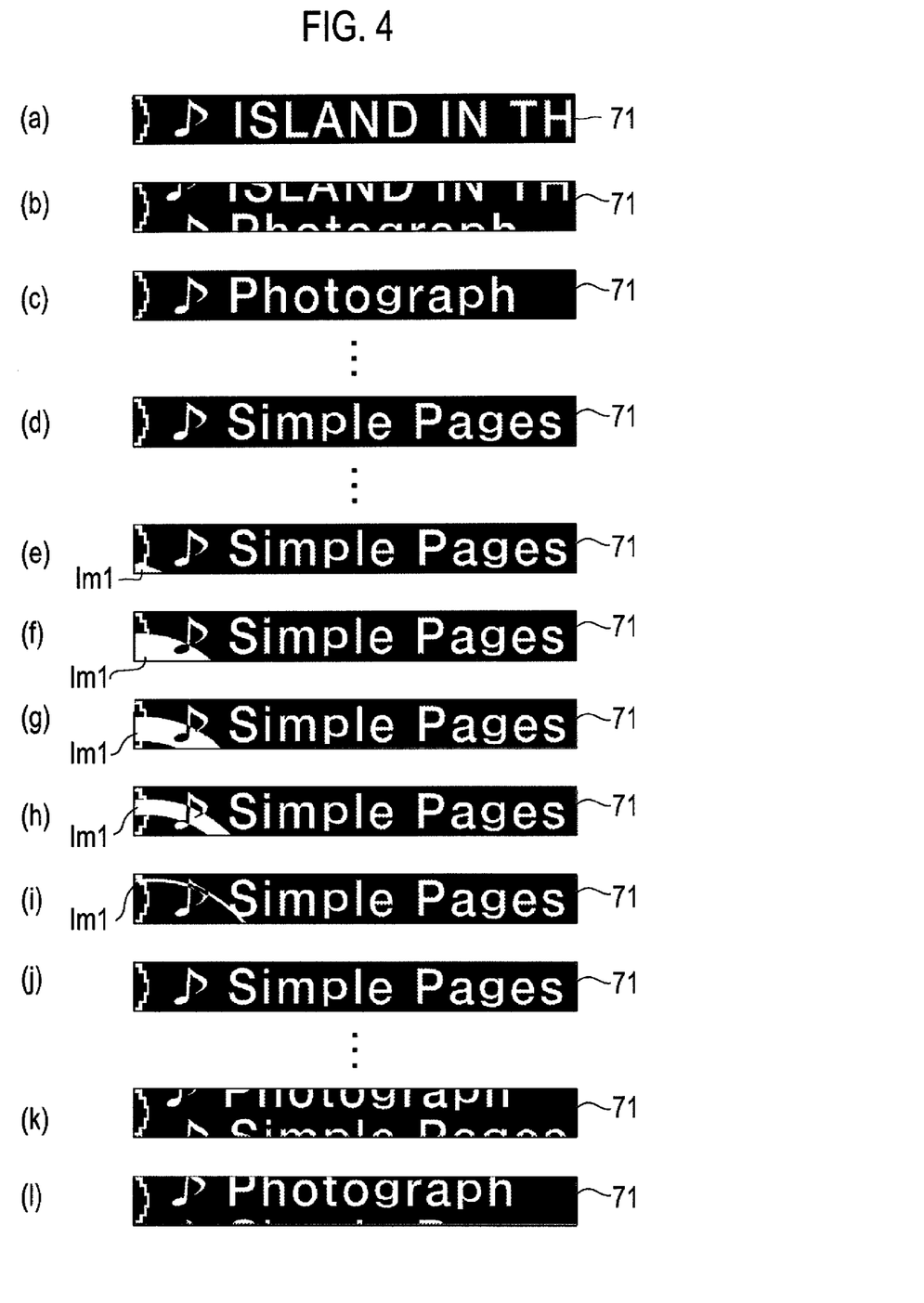
FIG. 4 It is a diagram that illustrates temporal changes in the first example of dynamic figures.

The dynamic figure Im1 will be described in detail with reference to FIG. 4. As shown in FIG. 4(*a*), in the situation where music "ISLAND IN TH . . . " is selected, when a user rotate the knob 51, the display is changed to next music "Photograph" as shown in FIGS. 4(*b*) and 4(*c*). When the user further rotates the knob 51 to select desired music to which the user wants to listen, the display is changed to the desired music "Simple Pages" as shown in FIG. 4(d). For example, when one second elapses since the name "Simple Pages" of music was displayed, the control portion 1 starts to display a dynamic figure Im1 as shown in FIG. 4(e).

When the enter key 52 remains not to be pushed, the control portion 1 continues to display the dynamic figure Im1. In the present embodiment, the dynamic figure Im1 is a figure in which a portion of annular shape or elliptically-annular shape is eliminated. The dynamic figure Im1 enlarges as shown in FIG. 4(f). As shown in FIGS. 4(g) and 4(h), the inner circumference of the dynamic figure Im1 spreads as the outer circumference of the dynamic figure Im1 spreads. Since a spreading rate of the inner circumference is higher than one of the outer circumference, the interval between the inner circumference and the outer circumference gradually narrows as shown in FIGS. 4(g) to 4(i). Thereafter, the dynamic figure Im1 disappears as shown in FIG. 4(j), and if the knob 51 or the enter key 52 is not operated, the states of FIGS. 4(e) to 4(j) are repeated.

When a user rotates the knob 51 while the enter key 52 remains not to be pushed, the control portion 1 changes a name of music as shown in FIGS. 4(k) and 4(l).

In the present embodiment, the dynamic figure Im1 is dynamically displayed such that a figure drawn around the position of the enter key 52 gradually grows wider. Therefore, in the situation where a certain selection item is displayed on the display screen 71, a user can easily recognize that he/she should push the enter key 52 located at the left end among the enter key 52, the favorite key 53, the talking start key 54 and the talking finish key 55 which are arranged in parallel to the display screen 71.

In the present embodiment, it is configured to change luminance of the illuminating portion 6 in response to display of the dynamic figure Im1 such that a user can further easily recognize an operation key to be pushed. Although it is not necessary to change luminance of the illuminating portion 6, it is preferable to change luminance of the illuminating portion 6 in response to display of the dynamic figure Im1. In FIG. 3, the operation key to be pushed is the enter key 52 and luminance of the illuminating portion 62 is changed in response to display of the dynamic figure Im1.

One example of a way of changing luminance of the illuminating portion 62 will be described with reference to FIG. 5. A rectangular area with hatching shown in FIG. 5(a) is display timing of the dynamic figure Im1. FIG. 5(b) illustrates luminance change of the illuminating portion 62 in response to display of the dynamic figure Im1. As shown in FIG. 5(b), the illuminating portion 62 is bright with the maximum luminance Lmax before a time t0. As described above, when the knob 51 is rotated to select certain music and the rotation is stopped at the time t0, display of the dynamic figure Im1 starts at a time t2 after one second elapsed. The illuminating portion 62 is bright with the minimum luminance Lmin at the time t1 before the time t2. The minimum luminance Lmin may be in an extinction state.

The display of the dynamic figure Im1 starts at the time t2 and finishes at a time t3. As shown in FIG. 5(b), luminance of the illuminating portion 62 gradually increases from the minimum luminance Lmin to the maximum luminance Lmax as the dynamic figure Im1 gradually grows wider. If the knob 51 is not being operated during a certain period from the time t3, the luminance again decreases to the minimum luminance Lmin at a time t4 before a time 5 and then display of the dynamic figure Im1 again starts at the time t5. If a time interval between the time t0 and the time t2 is one second, it is preferable that a time interval between the time t3 and the time t4 is less than one second. Although the luminance of the illuminating portion 62 instantly decreases from the maximum luminance Lmax to the minimum luminance Lmin in FIG. 5, it may gradually decrease to the minimum luminance Lmin.

If the knob 51 or the enter key 52 remains not to be operated, the display of the dynamic figure Im1 and the luminance change of the illuminating portion 62 repeat. If the knob 51 or the enter key 52 is operated, the luminance of the illuminating portion 62 returns to the maximum luminance Lmax.

Figure 6:
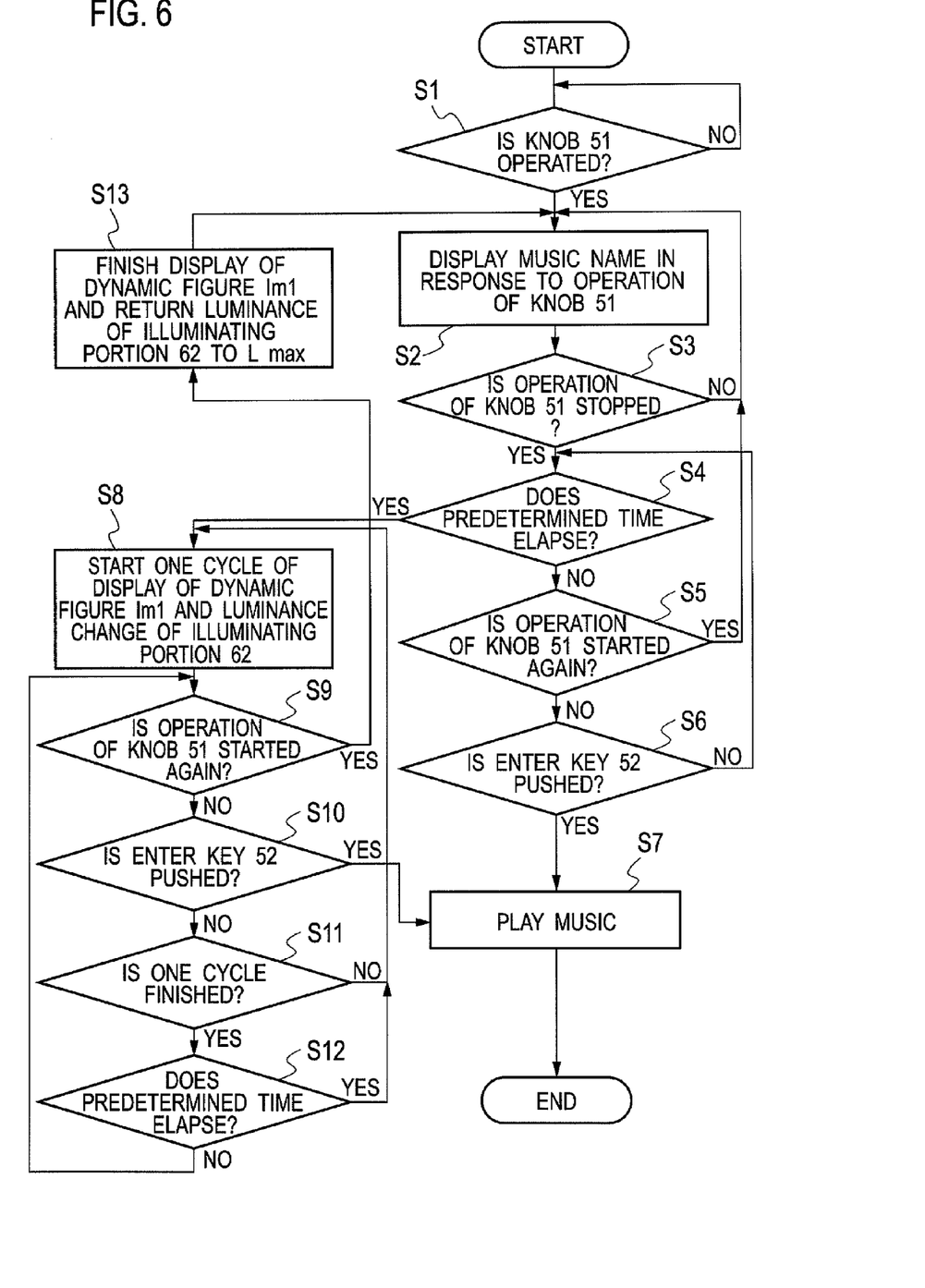
FIG. 6 It is a flowchart that illustrates processing performed by the electronic device according to the exemplary embodiment when a display in the first example of dynamic figures and a luminance change in the illuminating portion are combined.

Operation at the time when the audio device displays the dynamic figure Im1 will be described with reference to a flowchart in FIG. 6. Processing illustrated in FIG. 6 is carried out by the control portion 1 according to a certain program stored in the storing portion 4 when a selection item such as a music name is displayed on the display screen 71 as illustrated in FIG. 2. In FIG. 6, a selection item is described as a music name. In FIG. 6, the control portion 1 determines whether or not the knob 51 is operated at step S1. If it determines that the knob 51 is operated (Yes), the processing proceeds to step S2. If it does not determine that the knob 51 is operated (No), the processing returns to step S1.

At step S2, the control portion 1 displays on the display screen 71 a selection item in response to the operation of the knob 51. At step S3, the control portion 1 determines whether or not the operation of the knob 51 is stopped. If it determines that the operation of the knob 51 is stopped (Yes), the processing proceeds to step S4. If it does not determine that the operation of the knob 51 is stopped (No), the processing returns to step S2. At step S4, the control portion 1 determines whether or not a predetermined time (e.g., one second) elapses. If it does not determine that the predetermined time elapses (No), the control portion determines whether or not the operation of the knob 51 is started again at step S5. If it determines that the operation of the knob 51 is started again (Yes), the processing returns to step S2. If it does not determine that the operation of the knob 51 is started again (No), the processing proceeds to step S6.

At step S6, the control portion 1 determines whether or not the enter key 52 is pushed. If it determines that the enter key 52 is pushed (Yes), the control portion 1 plays music corresponding to a music name displayed on the display screen 71 at the time when the enter key 52 is pushed at step S7 and then the processing is finished. If it does not determine that the enter key 52 is pushed (No), the processing returns to step S4. If it determines that the operation of the knob 51 is stopped at step S3 and then both the knob 51 and the enter key 52 remain not to be operated, it determines that the predetermined time elapses (Yes) and then the processing proceeds to step S8.

Figure 5:
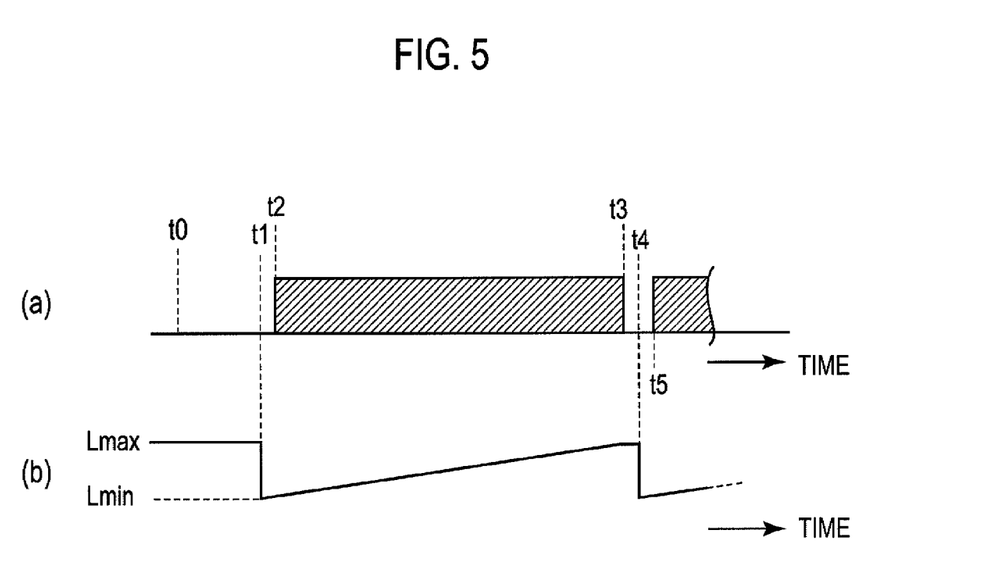
FIG. 5 It is a diagram that illustrates an example where a display in the first example of dynamic figures and a luminance change in an illuminating portion are combined.

At step S8, as illustrated in FIG. 5, the control portion 1 starts one cycle of display of the dynamic figure Im1 and luminance change of the illuminating portion 62. One cycle corresponds to the times t1 to t3 in FIG. 5. At step S9, the control portion 1 determines whether or not the operation of the knob 51 is started again. If it determines that the operation of the knob 51 is started again (Yes), the processing proceeds to step S13. At step S13, the control portion 1 finishes the display of the dynamic figure Im1, returns the luminance of the illuminating portion 62 to Lmax, and returns to step S2.

If it does not determine that the operation of the knob 51 is started again (No) at step S9, the control portion 1 determines whether or not the enter key 52 is pushed at step S10. If it determines that the enter key 52 is pushed (Yes), the control portion plays music corresponding to a music name displayed on the display screen 71 at the time when the enter key 52 is pushed at step S7 and then the processing is finished. If it does not determine that the enter key 52 is pushed (No), the control portion 1 determines whether or not one cycle of the display of the dynamic figure Im1 and luminance change of the illumination portion 62 is finished at step S11. If it does not determine that one cycle is finished (No), the processing returns to step S8 and the control portion 1 continues the display of the dynamic figure Im1 and the luminance change of the illuminating portion 62 until one cycle is finished.

If it determines that one cycle is finished at step S11 (Yes), the control portion 1 determines whether or not a predetermined time elapses at step S12. The predetermined time at step S12 is shorter than one second. If it determines that the predetermined time elapses at step S12 (Yes), the processing returns to step S8 and the control portion 1 repeats one cycle of display of the dynamic figure Im1 and luminance change of the illumination portion 62. If it does not determine that the predetermined time elapses at step S12 (No), the processing returns to step S9. As shown in steps S8 to S12, one cycle of display of the dynamic figure Im1 and luminance change of the illumination portion 62 is repeated until the knob 51 or the enter key 52 is operated.

As described above, in the present embodiment, since it is configured to display a certain selection item on the display screen 71, and display, after a predetermined time elapsed, a dynamic figure Im1 on a region corresponding to a position of an operation key (the enter key 52 in the above described example) to be operated in the situation where the selection item is displayed, a user can easily recognize the operation key to be operated. Therefore, a possibility that the user does not recognize which operation key should be pushed to feel uncomfortable can be reduced.

Figure 7:
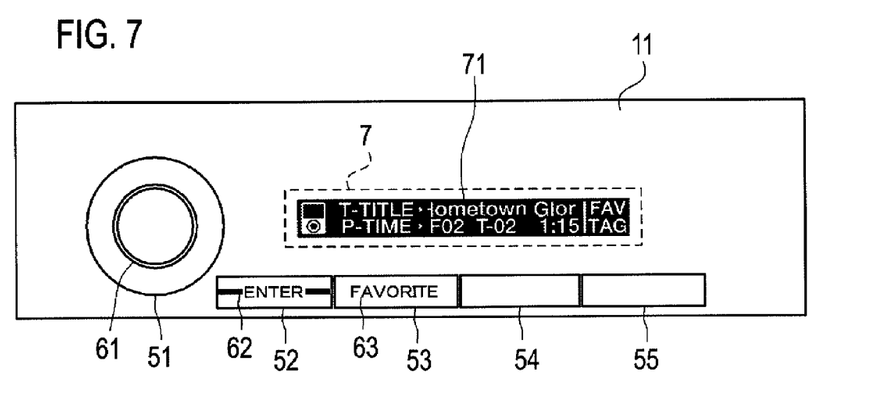
FIG. 7 It is a front view of the electronic device that shows a play state of music.

Next, another example of displaying a dynamic figure on the display screen 71 will be described. FIG. 7 illustrates a state of the front panel 11 at the time of playing a selected music as described above. As shown in FIG. 7, information such as a title of music being played and a playing time is displayed on the display screen 71. The illuminating portions 61 to 63 are bright, and this indicates that the knob 51, the enter key 52 and the favorite key 53 can be operated. The illuminating portions 64 and 65 are not shown because they are not bright, and this indicates that the talking start key 54 and the talking finish key 55 can not be operated. The illuminating portions 64 and 65 may be bright with reduced luminance to become dark. Hereinafter, luminance may be reduced instead of extinction state.

Figure 8:
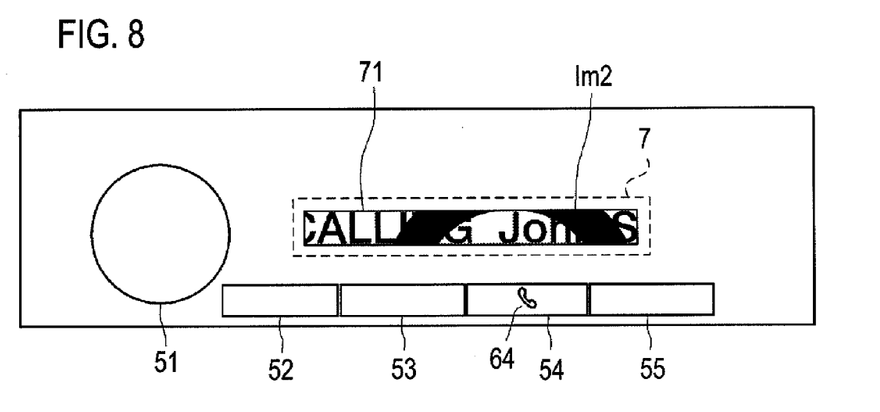
FIG. 8 It is a front view of an electronic device that illustrates a second example of dynamic figures.

FIG. 8 illustrates a state of the front panel 11 when a call is received on the mobile 20 in the state shown in FIG. 7. When a call is received on the mobile 20, the control portion 1 turns off the illuminating portions 61 to 63 and turns on the illuminating portion 64. This indicates that the knob 51, the enter key 52 and the favorite key 53 can not be operated and the talking start key 54 can be operated. The control portion 1 further displays on the display screen 71 characters "CALLING" indicating that a call is received, and a caller name "Jhon S . . . " previously registered in the storing portion, while scrolling them in a left direction. If a caller name is not registered, a telephone number may be displayed. If signage is displayed in its entirety within the display screen 71, it may not be scrolled.

The control portion 1 furthermore displays a dynamic figure Im2 on the display screen 71. FIG. 8 illustrates a momentary state of the dynamic figure Im2. The dynamic figure Im2 is displayed on a region corresponding to a position of the talking start key 54. As one example, the dynamic figure Im2 is a figure which gradually enlarges around the position of the talking start key 54. In the present embodiment, the dynamic figure Im2 is a figure in which a portion of annular shape or elliptically-annular shape is eliminated. Details of the dynamic figure Im2 will be described later.

Figure 9:
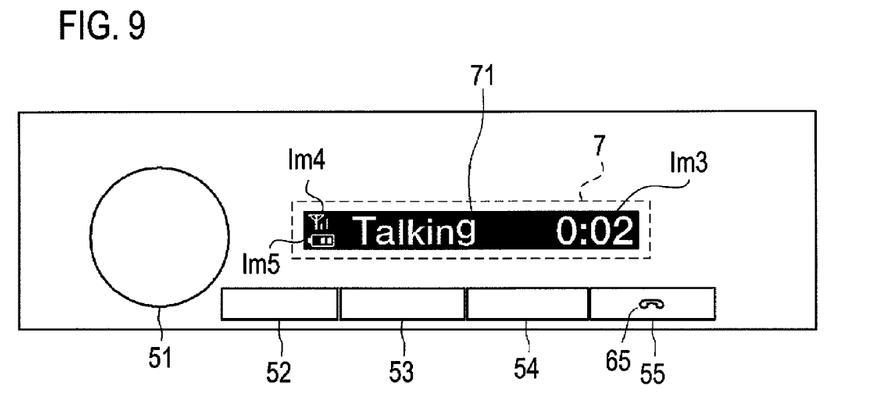
FIG. 9 It is a front view of the electronic device that shows a state of talking on a mobile.

FIG. 9 illustrates a state of the front panel 11 after the talking start key 54 is pushed to start talking. The control portion 1 displays on the display screen 71 characters "Talking" which indicates talking, and a talk time Im3. Since information indicating a radio wave condition from the mobile 20 and information regarding a remaining amount of battery are input in the control portion 1, the control portion 1 displays on the display screen 71 an image Im4 indicating the radio wave condition and an image Im5 indicating the remaining amount of battery at the same time. The control portion 1 turns off the illuminating portion 64 and turns on the illuminating portion 65. This indicates that the talking start key 54 can not be operated and the talking finish key 55 can be operated.

The dynamic figure Im2 will be described in detail with reference to FIG. 10. FIG. 10(a) is the same state as FIG. 7 and is a display state where music is being played. When a call is received on the mobile 20, the control portion 1 displays characters "CALLING . . . " as shown in FIG. 10(b). The control portion 1 scrolls the characters "CALLING . . . " in the left direction and starts to display the dynamic figure Im2 as shown in FIG. 10(c). As shown in FIGS. 10(d) to 10(h), the control portion 1 displays a gradually-enlarging figure whose the annular shape or elliptically-annular shape enlarges in the width direction and the height direction, as an image whose a portion out of the display screen 71 is eliminated.

Figure 10:
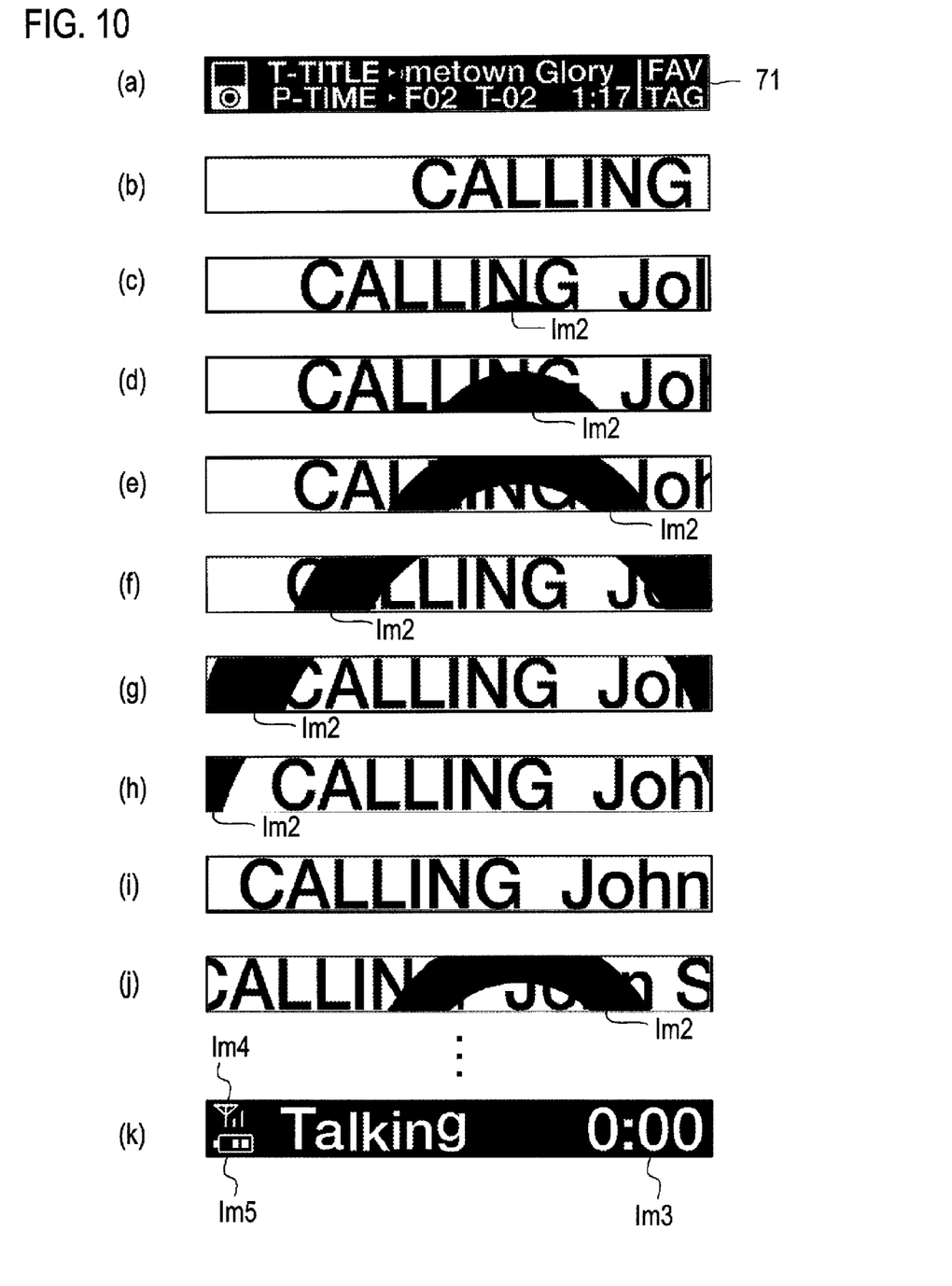
FIG. 10 It is a diagram that illustrates temporal changes in the second example of dynamic figures.

After the control portion 1 finishes one cycle of display of the dynamic figure Im2, if the talking start key 54 remains not to be pushed, the control portion 1 again displays the dynamic figure Im2 as shown in FIG. 10(j) after the dynamic figure Im2 is not displayed once as shown in FIG. 10(i). FIG. 10(k) is the same state as FIG. 9 and the talking state in which the talking start key 54 is pushed and talking is started. It is noted that the scrolling speed of the characters "CALLING . . . " is not constant in the example shown in FIG. 10. The scrolling speed may be constant.

In the example shown in FIG. 10, a spreading rate of the inner circumference of the dynamic figure Im2 is not higher than one of the outer circumference of the dynamic figure Im2, and the spreading rate of the inner circumference of the dynamic figure Im2 is the same as that of the outer circumference of the dynamic figure Im2. As well as the dynamic figure Im1, the spreading rate of the inner circumference of the dynamic figure Im2 may be higher than that of the outer circumference of the dynamic figure Im2.

Figure 11:
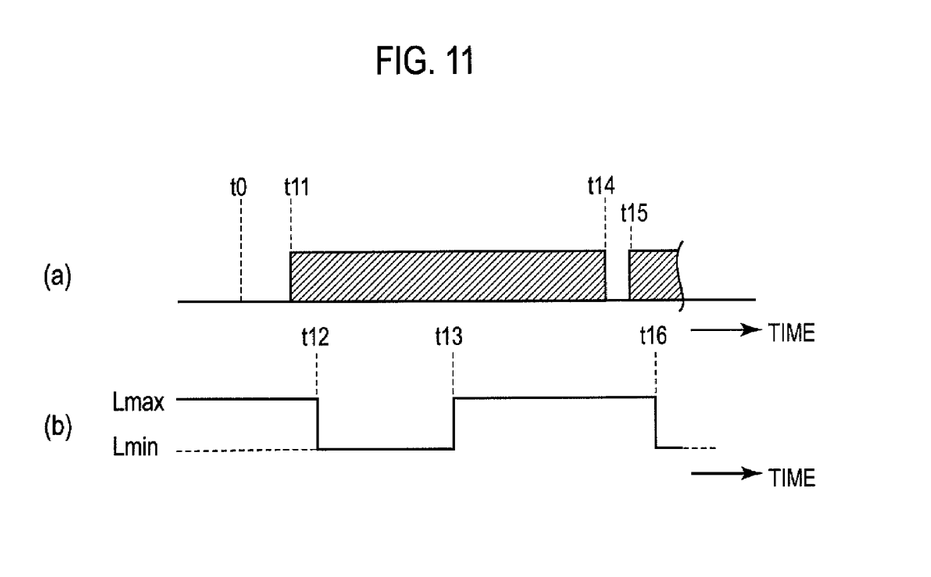
FIG. 11 It is a diagram that illustrates an example where a display in the second example of dynamic figures and a luminance change in an illuminating portion are combined.

In FIG. 10, as a preferable embodiment, the illuminating portion 64 is changed in response to display of the dynamic figure Im2. One example of a way of changing luminance of the illuminating portion 64 will be described with reference to FIG. 11. A rectangular region with hatching of FIG. 11(a) indicates a display timing of the dynamic figure Im2. FIG. 11(b) illustrates luminance change of the illuminating portion 64 in response to display of the dynamic figure Im2. As shown in FIG. 11(b), the illuminating portion 64 has been bright with the maximum luminance Lmax since before a time t10. When a call is received on the mobile 20 at the time t10, display of the dynamic figure Im1 starts at a time t11. The illuminating portion 64 is bright with the minimum luminance Lmin at a time t12 and returns to be bright with the maximum luminance Lmax at a time t13. The minimum luminance Lmin may be in an extinction state. One cycle of the dynamic figure Im2 finishes at a time t14.

Next cycle of the dynamic figure Im2 starts at a time t15. The illuminating portion 64 is bright with the minimum luminance Lmin at a time t16 and the same proceeding repeats. Namely, the illuminating portion 64 blinks within a display period in one cycle of the dynamic figure Im2. FIG. 11 also illustrates that the luminance of the illuminating portion 64 immediately decreases from the maximum luminance Lmax to the minimum luminance Lmin and then immediately increases from the minimum luminance Lmin to the maximum luminance Lmax. However, the luminance of the illuminating portion 64 may gradually decrease to the minimum luminance Lmin and then gradually increase to the maximum luminance Lmax. Although the illuminating portion 64 blinks in the example illustrated in FIG. 11, the luminance of the illuminating portion 64 may increase from the minimum luminance Lmin to the maximum luminance Lmax as well as the luminance control of the illuminating portion 62 illustrated in FIG. 5.

Operation at a time when the audio apparatus device displays the dynamic figure Im2 will be described with reference to a flowchart of FIG. 12. Proceeding illustrated in FIG. 12 is carried out by the control portion 1 according to a certain program stored in the storing portion 4 when music is being played and a hands-free talking on the mobile 20 is allowed in response to reception of a call on the mobile 20.

Figure 12:
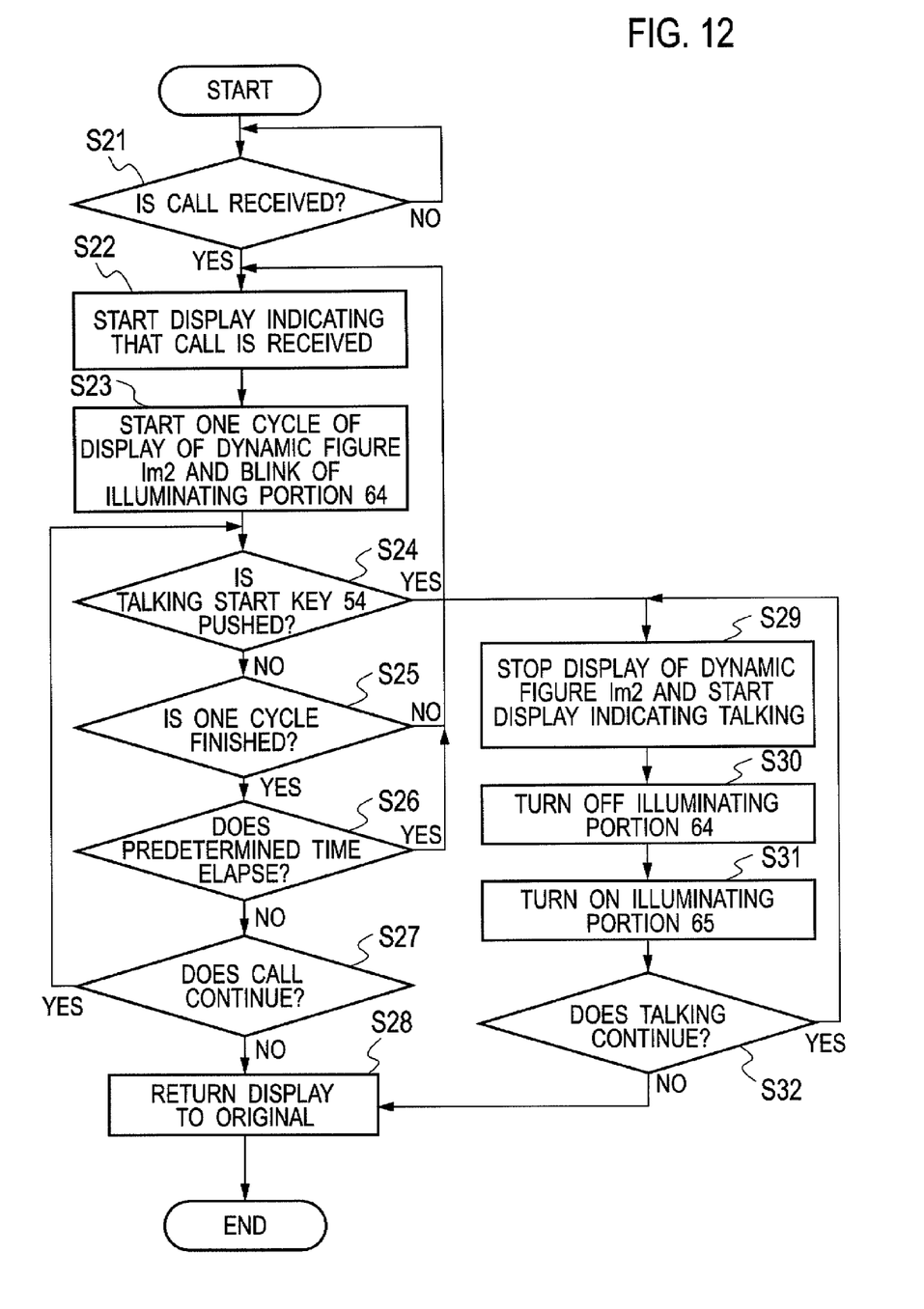
FIG. 12 It is a flowchart that illustrates processing performed by the electronic device according to the exemplary embodiment when a display in the second example of dynamic figures and a luminance change of the illuminating portion are combined.

In FIG. 12, the control portion 1 determines whether or not a call is received on the mobile 20 at step S21. If it determines that the call is received (Yes), the process proceeds to step S22. If it does not determine that the call is received (No), the process returns to step S21. The control portion 1 starts display indicating that a call is received, on the display screen 71 at step S22, and starts one cycle of display of the dynamic figure Im2 and blink of the illuminating portion 64 at step S23. The control portion 1 determines whether or not the talking start key 54 is pushed at step S24. If it does not determine that the talking start key 54 is pushed (No), the process proceeds to step S25.

The control portion 1 determines whether or not one cycle of the display of the dynamic figure Im2 and the blink of the illuminating portion 64 is finished at step S25. If it determines that one cycle is finished (Yes), the process proceeds to step S26. If it does not determine that one cycle is finished (No), the process returns to step S22. The control portion 1 determines whether or not a predetermined time elapses at step S26. If it determines that the predetermined time elapses (Yes), the process returns to step S22. If it does not determine that the predetermined time elapses (No), the process proceeds to step S27. The control portion 1 determines whether or not the call continues at step S27.

When a caller stops the call, the reception of call stops. Also, there is a case where the reception of call stops when a predetermined time elapses or the number of calls reaches a predetermined number after the call starts. In view of it, the control portion 1 determines whether or not the call continues at step S27. If it determines that the call continues (Yes), the process returns to step S24. If it does not determine that the call continues (No), the process returns the display screen 71 to the start display at step S28 and is finished.

If it determines that the talking start key 54 is pushed at step S24 (Yes), the process proceeds to step S29. The control portion 1 stops the display of the dynamic figure Im2 at step S29, and starts display which indicates talking. The control portion 1 turns off the illuminating portion 64 at step S30, and turns on the illuminating portion 65 at step S65. The control portion 1 determines whether or not the talking continues at step S32. If it determines that the talking continues (Yes), the process returns to step S29. If it does not determine that the talking continues (No), the process returns the display of the display screen 71 to the start display at step S28 and is finished.

As described above, in the present embodiment, since the audio device is configured to display the dynamic figure Im2 on a region corresponding to a position of an operation key (the talking start key 54 in the above-described example) to be operated when the audio device has a certain state and a call is received on the mobile 20, a user can easily recognize an operation key to be pushed. This reduce a possibility that a user does not know which operation key he/she should push to be at a loss.

In FIG. 1, the control portion 1 works as a display control portion that displays certain information on the display screen 71 of the display portion 7. The control portion 1 works as a luminance control portion that changes luminance of the illuminating portion 6 in response to display of the dynamic figure on the display screen 71. The control portion 1 displays on the display screen 71 information indicating a certain state when the electronic device has the certain state. Also, the control portion 1 displays the dynamic figure Im1 or Im2 on a region corresponding to a position of a specific operation key to be operated at the time of the certain state, among the operation keys 52 to 55 arranged along with the display screen 71.

The dynamic figures Im1 and Im2 are figures traveling away from the specific operation keys as shown in FIGS. 4 and 10. Contrary to the examples of FIGS. 4 and 10, they may be figures approaching the specific operation keys. Also, the dynamic figures Im1 and Im2 are figures spreading around the specific operation keys. Contrary to the examples of FIGS. 4 and 10, they may be figures narrowing around the specific operation keys.

In the present embodiment, the dynamic figure Im1 which is displayed when the enter key 52 should be operated, differs from the dynamic figure Im2 which is displayed when the talking start key 54 should be operated. Ways of luminance changes of the illuminating portions 62 and 64 differ from each other. Thus, since at least one of a pattern of the dynamic figure and a way of luminance change of the illuminating portion 6 is changed according to a position of an operation key to be operated, a user can recognize which operation key he/she should operation with reference to the pattern of the dynamic figure or the way of luminance change of the illuminating portion 6. Therefore, it is preferable to purposely change at least one of a pattern of the dynamic figure and a way of luminance change of the illuminating portion 6 according to a position of an operation key to be operated.

The present invention is not limited to the present embodiment and various change may be made without departing from the scope of the invention. As another example of dynamic figure, the figure may be an image of arrow which indicates a direction approaching a specific operation key. The image may be an arrow approaching without changing its size, or an arrow enlarging as approaching a specific operation key. The number of arrows may be one or more. As another example of dynamic figure, the figure may be a figure blowing up around a specific operation key. Although a verbal communication using the mobile 20 is described as an example in the present embodiment, a communication other than the verbal communication using the mobile may be allowed.

INDUSTRIAL APPLICABILITY

The present invention is not limited to the audio device described above, and may be applied to a navigation device, a personal computer, a radio receiver, a display device, and any other electronic device.

REFERENCE SIGNS LIST 1 control portion (display control portion, luminance control portion)
2 tuner
3 disc drive
4 storing portion
5 operating portion
6, 61 to 65 illuminating portions
7 display portion
8 sound output portion
9 sound input portion
10 communicating portion
20 mobile (portable terminal)
30 portable audio device
51 knob
52 to 55 operation keys
71 display screen
Im1, Im2 dynamic figures

The invention claimed is:

1. An electronic device comprising:
a display portion that has a display screen;
a plurality of operation keys arranged along with the display screen in a predetermined positional relationship with the display portion; and
a display controller that controls a display such that, responsive to a certain state of the electronic device, information indicating the certain state is displayed on the display screen,
wherein the display controller displays a dynamic figure on a region on the display screen corresponding to a position of a specific operation key to be operated at a time of the certain state, among the plurality of operation keys, the dynamic figure is a figure separating from the specific operation key while spreading around the specific operation key, or approaching the specific operation key while narrowing around the specific operation key to direct the user's attention to the specific operation key as an operative selection corresponding to the information indicating the certain state so that a user can easily recognize which key of operation keys to operate with reference to a pattern of the dynamic figure,
wherein the display controller does not displays the dynamic figure when there is no specific operation key as an optative selection corresponding to the information indicating the certain state;
and wherein a spreading or narrowing rate differs depending on a part of the dynamic figure such that the spreading rate of a part of the dynamic figure close to the specific operation key is higher than that of a part of the dynamic figure far from the specific operation key, or the narrowing rate of a part of the dynamic figured far from the specific operation key is higher than that of a part of the dynamic figure close to the specific operation key.

2. The electronic device according to claim 1, wherein the dynamic figure is a portion of annular shape, and
the spreading rate of an inner circumference of the dynamic figure is higher than that of an outer circumference of the dynamic figure.

3. The electronic device according to claim 1, wherein:
the certain state is a state where one selection item is displayed on the display screen among a plurality of selection items,
and wherein the specific operation key is an operation key to be used to establish the one selection item.

4. The electronic device according to claim 3, wherein the display controller starts display of the dynamic figure when a predetermined time elapses from the time of displaying the one selection item on the display screen.

5. The electronic device according to claim 1, wherein:
the certain state is a state where a call is received on a portable terminal connected to the electronic device and information indicating that the call is received is displayed on the display screen,
and wherein the specific operation key is an operation key to be used to start communication by the portable terminal.

6. The electronic device according to claim 5, wherein the display controller starts display of the dynamic figure when a predetermined time elapses from the time of displaying the information indicating that the call is received on the display screen.

7. A control method of an electronic device comprising:
displaying, responsive to a certain state of the electronic device, on a display screen, information indicating the certain state; and
displaying a dynamic figure on a region on the display screen corresponding to a position of a specific operation key to be operated at a time of the certain state, among a plurality of operation keys arranged along with the display screen in a predetermined positional relationship with the display portion,
wherein the dynamic figure is a figure separating from the specific operation key while spreading around the specific operation key, or approaching the specific operation key while narrowing around the specific operation key to direct the user's attention to the specific operation key as an optative selection corresponding to the information indicating the certain state so that a user can easily recognize which key of operation keys to operate with reference to a pattern of the dynamic figure,
wherein the dynamic figure is not displayed when there is no specific operation key as an optative selection corresponding to the information indicating the certain state,
and wherein a spreading or narrowing rate differs depending on a part of the dynamic figure such that the spreading rate of a part of the dynamic figure close to the specific operation key is higher than that of a part of the dynamic figure far from the specific operation key, or the narrowing rate of a part of the dynamic figured far from the specific operation key is higher than that of a part of the dynamic figure close to the specific operation key.

8. The control method of the electronic device according to claim 7, wherein
the dynamic figure is a portion of annular shape, and
the spreading rate of an inner circumference of the dynamic figure is higher than that of an outer circumference of the dynamic figure.

9. The control method of the electronic device according to claim 7, wherein:
the certain state is a state where one selection item is displayed on the display screen among a plurality of selection items,
and wherein the specific operation key is an operation key to be used to establish the one selection item.

10. The control method of the electronic device according to claim 9, further comprising:
starting display of the dynamic figure when a predetermined time elapses from the time of displaying the one selection item on the display screen.

11. The control method of the electronic device according to claim 7, wherein:
the certain state is a state where a call is received on a portable terminal connected to the electronic device and information indicating that the call is received is displayed on the display screen,
and wherein the specific operation key is an operation key to be used to start communication by the portable terminal.

12. The control method of the electronic device according to claim 11, further comprising:
starting display of the dynamic figure when a predetermined time elapses from the time of displaying the information indicating that the call is received on the display screen.

13. A non-transitory computer readable medium storing a program causing a computer mounted in an electronic device to execute a method comprising:
displaying, responsive to a certain state of the electronic device, on a display screen, information indicating the certain state; and displaying a dynamic figure on a region on the display screen corresponding to a position of a specific operation key to be operated at a time of the certain state, among a plurality of operation keys arranged along with the display screen in a predetermined positional relationship with the display portion,
wherein the dynamic figure is a figure separating from the specific operation key while spreading around the specific operation key, or approaching the specific operation key while narrowing around the specific operation key to direct the user's attention to the specific operation key as an optative selection corresponding to the information indicating the certain state so that a user can easily recognize which key of operation keys to operate with reference to a pattern of the dynamic figure,
wherein the dynamic figure is not displayed when there is no specific operation key as an optative selection corresponding to the information indicating the certain state,
and wherein a spreading or narrowing rate differs depending on a part of the dynamic figure such that the spreading rate of a part of the dynamic figure close to the specific operation key is higher than that of a part of the dynamic figure far from the specific operation key, or the narrowing rate of a part of the dynamic figured far from the specific operation key is higher than that of a part of the dynamic figure close to the specific operation key.

14. The non-transitory computer readable medium storing the program according to claim 13, wherein
the dynamic figure is a portion of annular shape, and
the spreading rate of an inner circumference of the dynamic figure is higher than that of an outer circumference of the dynamic figure.

15. The non-transitory computer readable medium storing the program according to claim 13, wherein:
the certain state is a state where one selection item is displayed on the display screen among a plurality of selection items,
and wherein the specific operation key is an operation key to be used to establish the one selection item.

16. The non-transitory computer readable medium storing the program according to claim 15, wherein the method further comprises starting display of the dynamic figure when a predetermined time elapses from the time of displaying the one selection item on the display screen.

17. The non-transitory computer readable medium storing the program according to claim 13, wherein:
the certain state is a state where a call is received on a portable terminal connected to the electronic device and information indicating that the call is received is displayed on the display screen,
and wherein the specific operation key is an operation key to be used to start communication by the portable terminal.

18. The non-transitory computer readable medium storing the program according to claim 17, wherein the method further comprises starting display of the dynamic figure when a predetermined time elapses from the time of displaying the information indicating that the call is received on the display screen.

* * * * *

UNITED STATES PATENT AND TRADEMARK OFFICE
CERTIFICATE OF CORRECTION

PATENT NO. : 9,733,830 B2  
APPLICATION NO. : 13/518655  
DATED : August 15, 2017  
INVENTOR(S) : Hitomi Tadokoro et al.

Page 1 of 1

It is certified that error appears in the above-identified patent and that said Letters Patent is hereby corrected as shown below:

In the Claims

Claim 1, Column 13, Line 24, please delete the word "displays" and replace it with "display".

Signed and Sealed this  
Twenty-fourth Day of October, 2017

Joseph Matal  
*Performing the Functions and Duties of the*  
*Under Secretary of Commerce for Intellectual Property and*  
*Director of the United States Patent and Trademark Office*